(12) United States Patent
Huang et al.

(10) Patent No.: US 11,829,158 B2
(45) Date of Patent: Nov. 28, 2023

(54) SYSTEM AND METHOD FOR SYNCHRONIZING MOTION OF MULTIPLE VEHICLES IN AN INDEPENDENT CART SYSTEM

(71) Applicant: Rockwell Automation Technologies, Inc., Mayfield Heights, OH (US)

(72) Inventors: Yuhong Huang, Acton, MA (US); Tracy M. Clark, Devens, MA (US); Jason A. Young, Marlborough, MA (US); Neil R. Bentley, Westborough, MA (US); Jesse R. Mendenhall, Brookline, NH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 112 days.

(21) Appl. No.: 17/411,791

(22) Filed: Aug. 25, 2021

(65) Prior Publication Data
US 2023/0068768 A1   Mar. 2, 2023

(51) Int. Cl.
*G05D 1/02*   (2020.01)

(52) U.S. Cl.
CPC ......... *G05D 1/0293* (2013.01); *G05D 1/0223* (2013.01); *G05D 1/0276* (2013.01); *G05D 1/0295* (2013.01)

(58) Field of Classification Search
CPC .. G05D 1/0293; G05D 1/0223; G05D 1/0276; G05D 1/0295
See application file for complete search history.

(56) References Cited

U.S. PATENT DOCUMENTS

| 7,458,454 B2 | 12/2008 | Mendenhall |
| 8,616,134 B2 | 12/2013 | King et al. |
| 8,863,669 B2 | 10/2014 | Young et al. |

(Continued)

FOREIGN PATENT DOCUMENTS

| CN | 113190020 A | 7/2021 |
| EP | 3 196 719 | 7/2017 |

OTHER PUBLICATIONS

Extended European Search Report for Application 18195836.4-1205 dated May 28, 2019 (13 pages).

(Continued)

*Primary Examiner* — Kenneth J Malkowski
*Assistant Examiner* — Carville Albert Hollingsworth, IV
(74) *Attorney, Agent, or Firm* — Boyle Frederickson, SC

(57) ABSTRACT

Synchronization of multiple vehicles in an independent cart system to reduce spacing and increase throughput designates one of the movers as a leader and at least one additional mover as a follower, defining a chain of vehicles. A motion command for the chain is provided to a controller for the leader, and the controller generates a motion profile. The controller passes this motion profile to a controller for each of the follower movers. If the follower is unable to maintain the motion profile for the leader, the controller for the follower generates a message to the controller for the leader indicating a modification to the motion profile is required. The controller for the leader modifies the motion profile and forwards the modified motion profile to controllers for each follower. If all movers are following the modified profile, the controller for the leader may return to the original motion profile.

20 Claims, 8 Drawing Sheets

(56) References Cited

U.S. PATENT DOCUMENTS

| | | |
|---|---|---|
| 9,847,742 B2 | 12/2017 | Suzuki et al. |
| 10,442,637 B2 | 10/2019 | Huang et al. |
| 2007/0059129 A1* | 3/2007 | Hugler .............. H01L 21/67748 |
| | | 414/217 |
| 2011/0125350 A1 | 5/2011 | Won et al. |
| 2012/0247925 A1 | 10/2012 | Cooke |
| 2015/0344233 A1 | 12/2015 | Kleinikkink et al. |
| 2016/0355350 A1 | 12/2016 | Yamamoto |
| 2017/0229991 A1 | 8/2017 | Huber et al. |
| 2018/0364663 A1* | 12/2018 | Millar .................. G05D 1/0027 |
| 2019/0084781 A1* | 3/2019 | Huang ............... G05B 19/4185 |
| 2020/0081454 A1 | 3/2020 | Kwak |
| 2020/0171958 A1* | 6/2020 | Huang .................... B60L 13/10 |

OTHER PUBLICATIONS

Kar-Han Tan et al.; "Virtual structures for high-precision cooperative mobile robotic control"; Intelligent Robts and Systems '96; RSJ International Conference on Osaka, Japan Nov. 4-8, 1996; New York, NY, USA, IEEE, US, vol. 1, Nov. 4, 1996, pp. 132-139—(8) pages.

Extended European Search Report dated Jan. 25, 2023; Application No. /Patent No. 22190266.1-1205—(12) pages.

\* cited by examiner

SYSTEM AND METHOD FOR SYNCHRONIZING MOTION OF MULTIPLE VEHICLES IN AN INDEPENDENT CART SYSTEM

BACKGROUND INFORMATION

The subject matter disclosed herein relates to motion control for an independent cart system. More specifically, an improved system for controlling multiple vehicles, configured to travel in tandem along a track of the independent cart system, includes bidirectional communication between controllers for each of the vehicles, where follower vehicles update a leader vehicle with the follower's ability to execute a motion profile for the leader vehicle.

Motion control systems utilizing movers and linear drives can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled "movers," each supported on a track for motion along the track. The track is made up of a number of track segments that, in turn, hold individually controllable electric coils. Successive activation of the coils establishes a moving electromagnetic field that interacts with the movers and causes the mover to travel along the track.

Each of the movers may be independently moved and positioned along the track in response to the moving electromagnetic field generated by the coils. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

In certain applications, it is desirable to control motion of multiple movers in tandem to form "a chain" of movers traveling sequentially along the track. Adjacent movers may be physically linked via a coupling member or via a load spanning multiple movers. Alternately, adjacent movers may be virtually linked by sharing a motion profile. When movers are independently controlled, they have no knowledge of the motion profile of the adjacent mover travelling ahead. Each mover operates under the assumption that the mover immediately in front may stop at any time at its current location and, therefore, the minimum spacing between movers requires a sufficient distance such that one mover can stop before reaching the current position of the mover immediately in front. However, when movers are operating in tandem as a result of either a physical or virtual link, it is possible to have adjacent movers travel closer together than they otherwise may be permitted, because they follow a common motion profile.

Although two adjacent movers, having nominally identical construction, may receive identical motion profile commands, the movers, in practice, will often not follow identical motion profiles. Each mover has some physical differences due, for example, to manufacturing tolerances or wear. Similarly, the track has variations along its length due to manufacturing tolerances or wear. The strength of an electromagnetic field generated along the track may vary due to variations in the coils embedded in the track. Additionally, performance of a mover varies on a curved section compared to a straight section due to centrifugal forces experienced by the mover. As two movers transition from a straight section to a curved section or from a curved section to a straight section performance of the mover on the curved section varies from performance of the mover on the straight section. Still other variations in performance may occur from damage to a mover or to a track section or from debris present along the track. As a result of any of these variations, two adjacent movers having nominally identical construction and receiving an identical motion profile command will often not follow an identical motion profile as they travel along the track.

When movers are operating in tandem, the spacing is reduced in large part based on the assumption that they will be following identical motion profiles. If, however, one mover is unable to follow the motion profile, the reduced spacing increases the potential for a collision between adjacent movers. Thus, to reduce the potential for collision, the spacing between adjacent movers requires a minimum spacing having a sufficient distance to account for variations between movers and or variations in the track prevent collisions.

Thus, it would be desirable to provide an improved system and method for synchronizing motion of multiple vehicles in tandem to reduce spacing between vehicles and increase throughput an independent cart system.

BRIEF DESCRIPTION

According to one embodiment of the invention, a system for synchronizing motion of multiple movers in an independent cart system includes a first mover for leading a chain of movers, at least one additional mover for following the first mover within the chain of movers, a first controller configured to control operation of the first mover, and at least one additional controller configured to control operation of the at least one additional mover. The first controller is configured to obtain a desired motion profile for the first mover and to transmit the desired motion profile to the at least one additional controller. The at least one additional controller is configured to determine a desired hold back for the at least one additional mover and to transmit the desired hold back to the first controller. The first controller is configured to modify the desired motion profile as a function of the desired hold back received from the at least one additional controller.

According to another embodiment of the invention, a method for synchronizing motion of multiple movers in an independent cart system obtains a desired motion profile for a first mover with a first controller and transmits the desired motion profile from the first controller to at least one additional controller. A desired hold back is determined for at least one additional mover with the at least one additional controller. The hold back is transmitted from the at least one additional controller to the first controller, and the desired motion profile is modified in the first controller as a function of the desired hold back.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
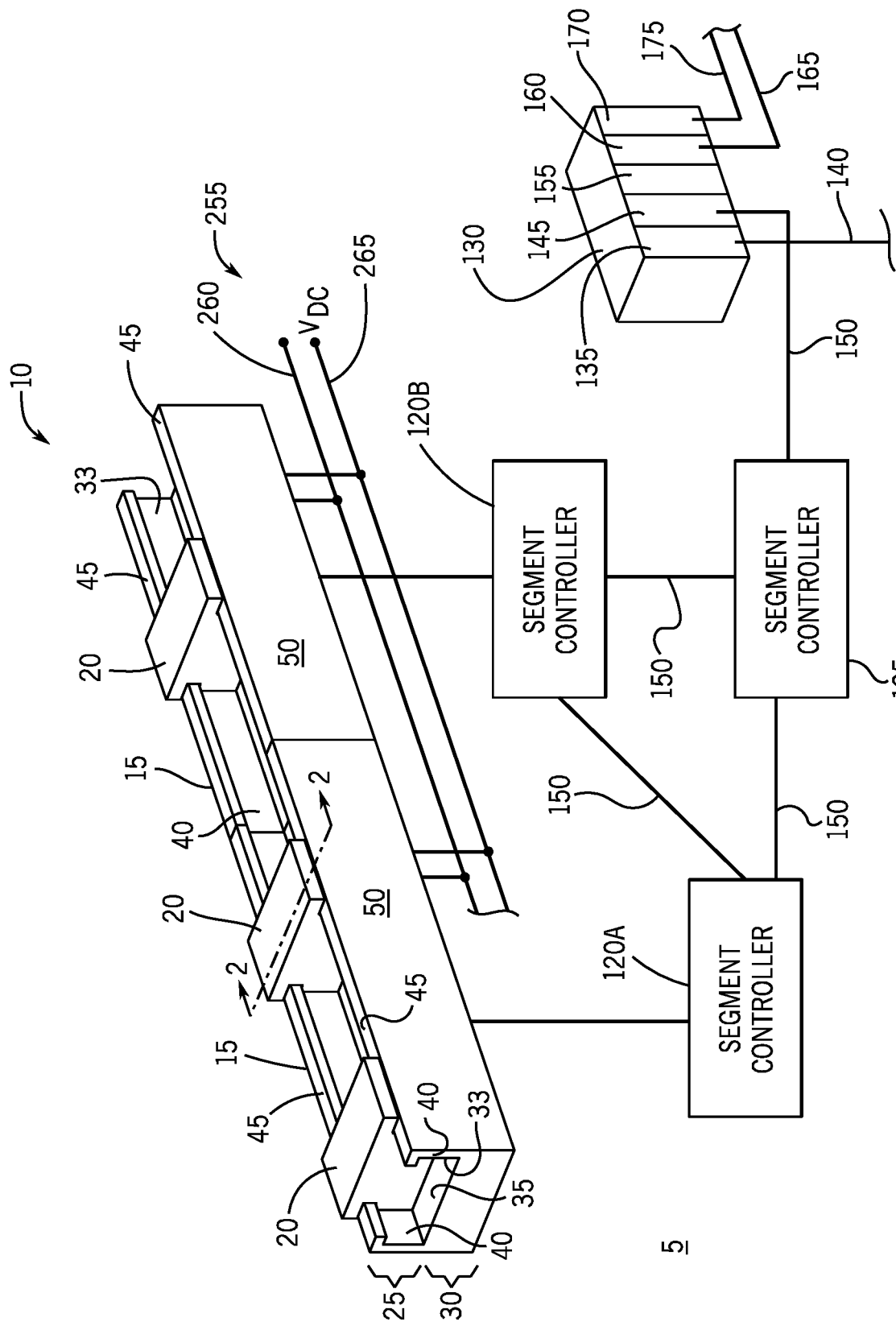
FIG. 1 is a schematic representation of an exemplary control system for a linear drive system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes an improved system and method for synchronizing motion of multiple vehicles in tandem to reduce spacing between vehicles and increase throughput in an independent cart system. One of the movers in the independent cart system is designated as a leader, and at least one additional mover in the independent cart system is designated as a follower. The leader and follower(s) define a chain, or a platoon, of vehicles which are configured to travel together along a track of the independent cart system. A motion command for the chain of movers is provided to a controller for the leader. The controller generates a motion profile for the leader. The controller passes this motion profile to a controller for each of the other movers in the chain. Depending on the present location along the track, the same controller may be responsible for control of the leader and one or more of the followers. Alternately, separate controllers may be responsible for control of the leader and for control of one or more of the followers. The controller for each of the followers commands the movers to follow the motion profile for the leader and monitors performance of the follower for which it is responsible. If the follower is unable to maintain the motion profile for the leader, the controller for the follower generates a message to the controller for the leader indicating a modification to the motion profile is required in order for the follower to maintain the desired motion profile. The message also includes data quantifying the modification required, such as an amount of position error presently observed by the controller for the follower. The controller for the leader modifies the motion profile and forwards the modified motion profile to controllers for each follower. If the leader is following a modified motion profile and the follower(s) are able to maintain the modified motion profile, the controller for the leader may return to the original motion profile and forward the new profile to the controllers for each follower. Thus, if a follower is temporarily unable to maintain the desired motion profile for the chain of movers, the controller for the leader can adjust the motion profile, allowing the follower to catch up and then return to the original motion profile.

Turning initially to FIGS. 1-4, an exemplary independent cart system 5 (or simply "system 5") for moving articles or products includes a track 10 made up of multiple segments 15. According to the illustrated system 5, two segments 15 are joined end-to-end to define the illustrated track configuration. The illustrated segments 15 are both straight segments having generally the same length. It is understood that track segments of various sizes, lengths, and shapes may be connected together to form the track 10 without deviating from the scope of the invention. Track segments 15 may be joined to form a generally closed loop supporting a set of movers 20 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The width of the track 10 may be greater in either the horizontal or vertical direction according to application requirements. The movers 20 will travel along the track and take various orientations according to the configuration of the track 10 and the relationships discussed herein may vary accordingly.

According to the illustrated system 5, each track segment 15 includes an upper portion 25 and a lower portion 30. The upper portion 25 is configured to carry the movers 20 and the lower portion 30 is configured to house the control elements. As illustrated, the upper portion 25 includes a generally u-shaped channel 33 extending longitudinally along the upper portion 25 of each segment. The channel 33 includes a bottom surface 35 and a pair of side walls 40, where each side wall 40 includes a rail 45 extending along an upper edge of the side wall 40. The bottom surface 35, side walls 40, and rails 45 extend longitudinally along the track segment 15 and define a guideway along which the movers 20 travel. According to one embodiment, the surfaces of the channel 33 (i.e., the bottom surface 35, side walls 40 and rails 45) are planar surfaces made of a low friction material along which movers 20 may slide. The contacting surfaces of the movers 20 may also be planar and made of a low friction material. It is contemplated that the surface may be, for example, nylon, Teflon®, aluminum, stainless steel and the like. Optionally, the hardness of the surfaces on the track segment 15 are greater than the contacting surface of the movers 20 such that the contacting surfaces of the movers 20 wear faster than the surface of the track segment 15. It is further contemplated that the contacting surfaces of the movers 20 may be removably mounted to the housing of the mover 20 such that they may be replaced if the wear exceeds a predefined amount. According to still other embodiments, the movers 20 may include low-friction rollers to engage the surfaces of the track segment 15. Optionally, the surfaces of the channel 33 may include different cross-sectional forms with the mover 20 including complementary sectional forms. Various other combinations of shapes and construction of the track segment 15 and mover 20 may be utilized without deviating from the scope of the invention.

According to the illustrated system 5, each mover 20 is configured to slide along the channel 33 as it is propelled by a linear drive system. The mover 20 includes a body 55 configured to fit within the channel 33. The body 55 includes a lower surface 60, configured to engage the bottom surface 35 of the channel 33, and side surfaces 65 configured to engage the side walls 40 of the channel 33. The mover 20 further includes a shoulder 70 extending inward from each of the side surfaces 65. The shoulder 70 has a width equal to or greater than the width of the rail 45 protruding into the channel 33. A neck of the mover then extends upward to a top surface 75 of the body 55. The neck extends for the thickness of the rails such that the top surface 75 of the body 55 is generally parallel with the upper surface of each rail 45. The mover 20 further includes a platform 80 secured to the top surface 75 of the body 55. According to the illustrated embodiment, the platform 80 is generally square and the width of the platform 80 is greater than the width between the rails 45. The lower surface of the platform 80, an outer surface of the neck, and an upper surface of the shoulder 70 define a channel 85 in which the rail 45 runs. The channel 85 serves as a guide to direct the mover 20 along the track. It is contemplated that platforms or attachments of various shapes may be secured to the top surface 75 of the body 55. Further, various workpieces, clips, fixtures, and the like may be mounted on the top of each platform 80 for engagement with a product to be carried along the track by the mover 20. The platform 80 and any workpiece, clip, fixture, or other attachment present on the platform may define, at least in part, a load present on the mover 20.

Figure 2:
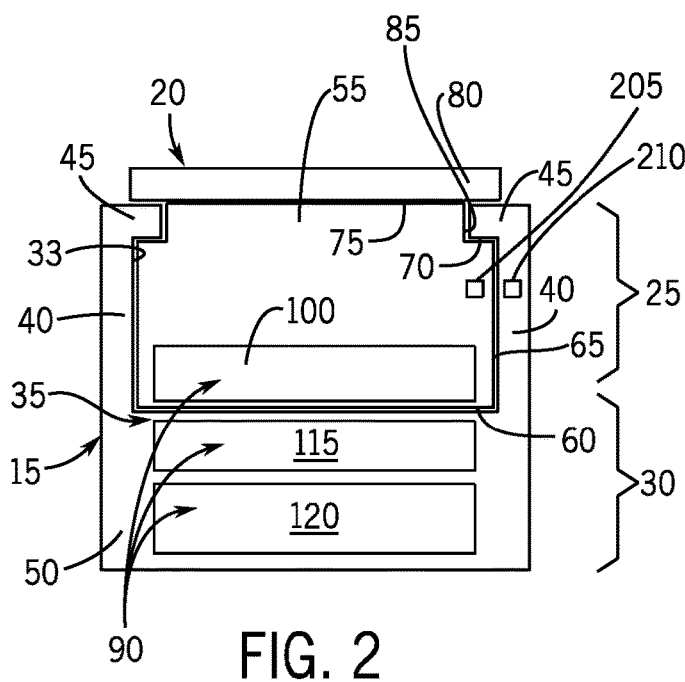
FIG. 2 is a sectional view of one embodiment of a mover and track segment included in the linear drive system taken at 2-2 of FIG. 1.
Figure 7:
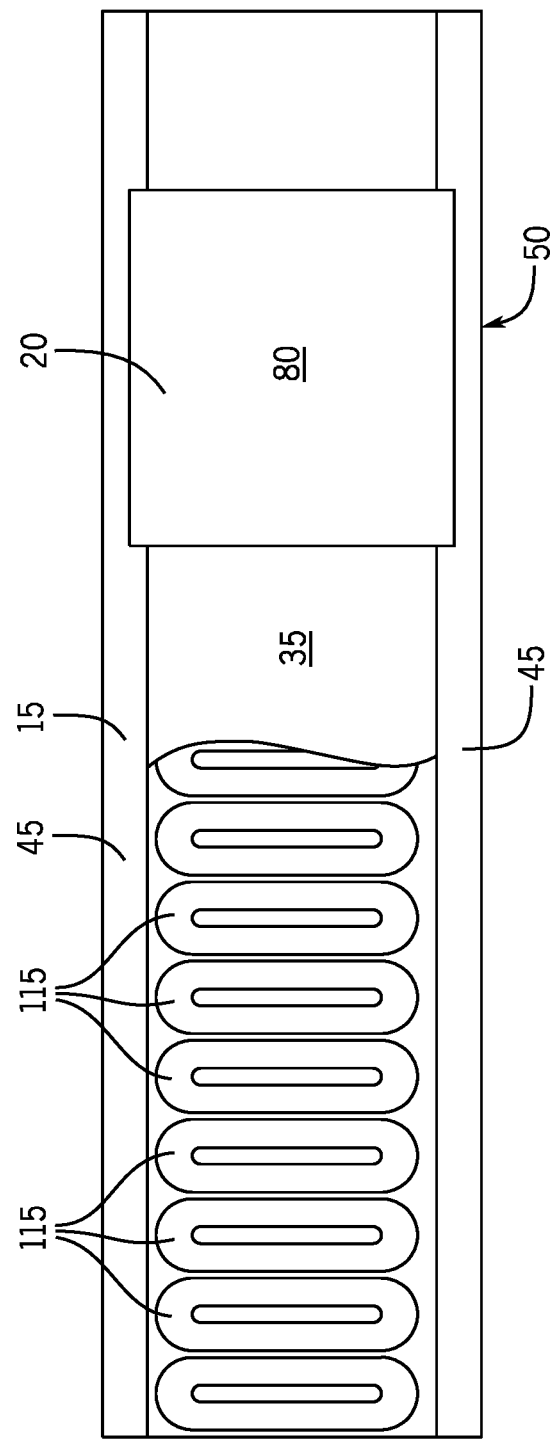
FIG. 7 is a partial top cutaway view of the mover and track segment of FIG. 2.

The mover 20 is carried along the track 10 by a linear drive system 90 (FIG. 2). The linear drive system is incorporated in part on each mover 20 and in part within each track segment 15. With reference also to FIG. 7, drive coils 115 are positioned along the length of each track segment, and one or more drive members 100 are mounted to each mover 20. It is contemplated that the drive members may be drive magnets 118, steel back iron and teeth, conductors, or any other suitable member that will interact with the electromagnetic fields generated by the coils 115 to propel each mover 20 along the track 10. For convenience, each drive member 100 will be discussed herein as a drive magnet 118. Alternately, it is contemplated that drive members 100 may be mounted along the length of each track segment and one or more drive coils 115 may be mounted to each mover 20 with the associated controllers to regulate current flow in each drive coil also mounted to each mover.

Figure 3:
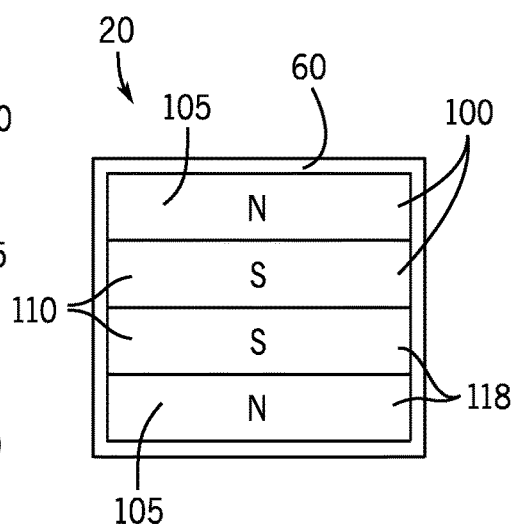
FIG. 3 is a bottom plan view of the exemplary mover of FIG. 2.
Figure 4:
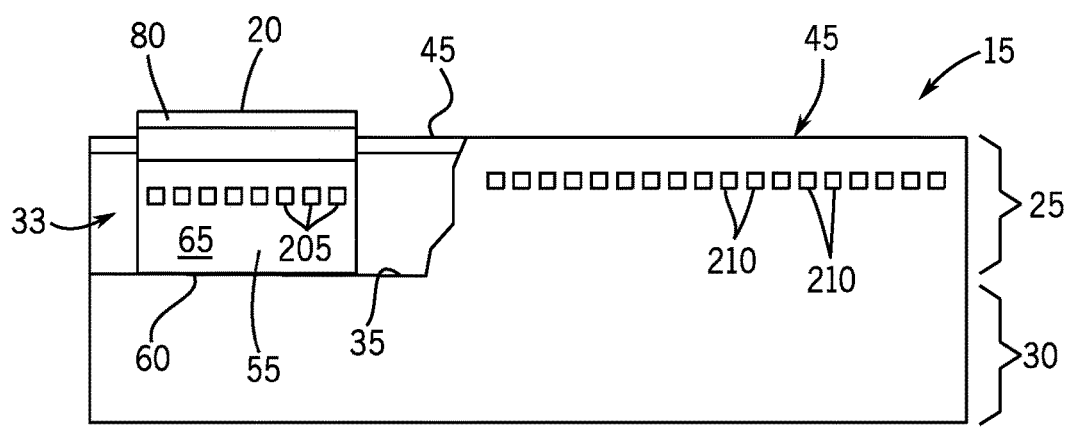
FIG. 4 is a partial side cutaway view of the mover and track segment of FIG. 2.

With reference to FIG. 3, the drive magnets 118 are arranged in a block on the lower surface of each mover. The drive magnets 118 include positive magnet segments 105, having a north pole, N, facing outward from the mover and negative magnet segments 110, having a south pole, S, facing outward from the mover. According to the illustrated system 5, two positive magnet segments 105 are located on the outer sides of the set of magnets and two negative magnet segments 110 are located between the two positive magnet segments 105. Optionally, the positive and negative motor segments may be placed in an alternating configuration. In still other constructions, a single negative magnet segment 110 may be located between the positive magnet segments 105. According to still another embodiment, the drive magnets 118 may utilize a Halbach array of magnets. The Halbach array inserts magnets rotated ninety degrees such that the north and south polarity of the rotated magnets appears as "east" or "west" to the other magnets. The effect of the rotation is to enhance the strength of the magnetic field along one side of the magnet array (i.e., the side facing the drive coils) and to reduce the strength of the magnetic field along the other side of the magnet array (i.e., the side facing away from the drive coils). Various other configurations of the drive magnets 118 may be utilized without deviating from the scope of the invention.

Figure 5:
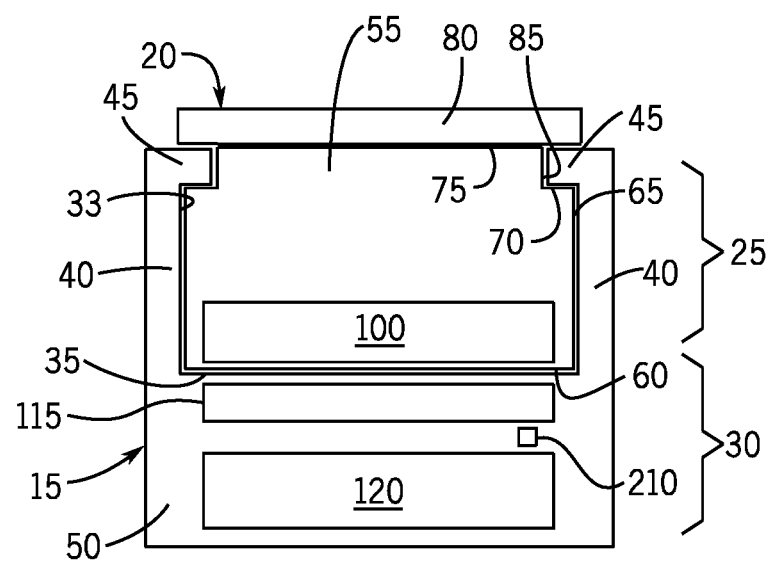
FIG. 5 is a sectional view of another embodiment of a mover and track segment included in the linear drive system taken at 2-2 of FIG. 1.

The linear drive system 90 further includes a series of coils 115 spaced along the length of the track segment 15. With reference also to FIGS. 5 and 7, the coils 115 may be positioned within the housing 50 for the track segment 15 and below the bottom surface 35 of the channel 33. The coils 115 are energized sequentially according to the configuration of the drive magnets 118 present on the movers 20. The sequential energization of the coils 115 generates a moving electromagnetic field that interacts with the magnetic field of the drive magnets 118 to propel each mover 20 along the track segment 15.

A segment controller 120 is provided with each track segment 15 to control the linear drive system and to achieve the desired motion of each mover 20 along the track segment 15. Although illustrated in FIG. 1 as blocks external to the track segments 15, the arrangement is to facilitate illustration of interconnects between controllers. As shown in FIG. 2, it is contemplated that each segment controller 120 may be mounted in the lower portion 30 of the track segment 15. Each segment controller 120 is in communication with a central controller 125 which is, in turn, in communication with an industrial controller 130. The industrial controller 130 may be, for example, a programmable logic controller (PLC) configured to control elements of a process line stationed along the track 10. The process line may be configured, for example, to fill and label boxes, bottles, or other containers loaded onto or held by the movers 20 as they travel along the line. In other implementations, robotic assembly stations may perform various assembly and/or machining tasks on workpieces carried along by the movers 20. The exemplary industrial controller 130 includes: a power supply 135 with a power cable 140 connected, for example, to a utility power supply; a communication module 145 connected by a network medium 150 to the central controller 125; a processor module 155; an input module 160 receiving input signals 165 from sensors or other devices along the process line; and an output module 170 transmitting control signals 175 to controlled devices, actuators, and the like along the process line. The processor module 155 may identify when a mover 20 is required at a particular location and may monitor sensors, such as proximity sensors, position switches, or the like to verify that the mover 20 is at a desired location. The processor module 155 transmits the desired locations of each mover 20 to a central controller 125 where the central controller 125 operates to generate commands for each segment controller 120.

Figure 8:
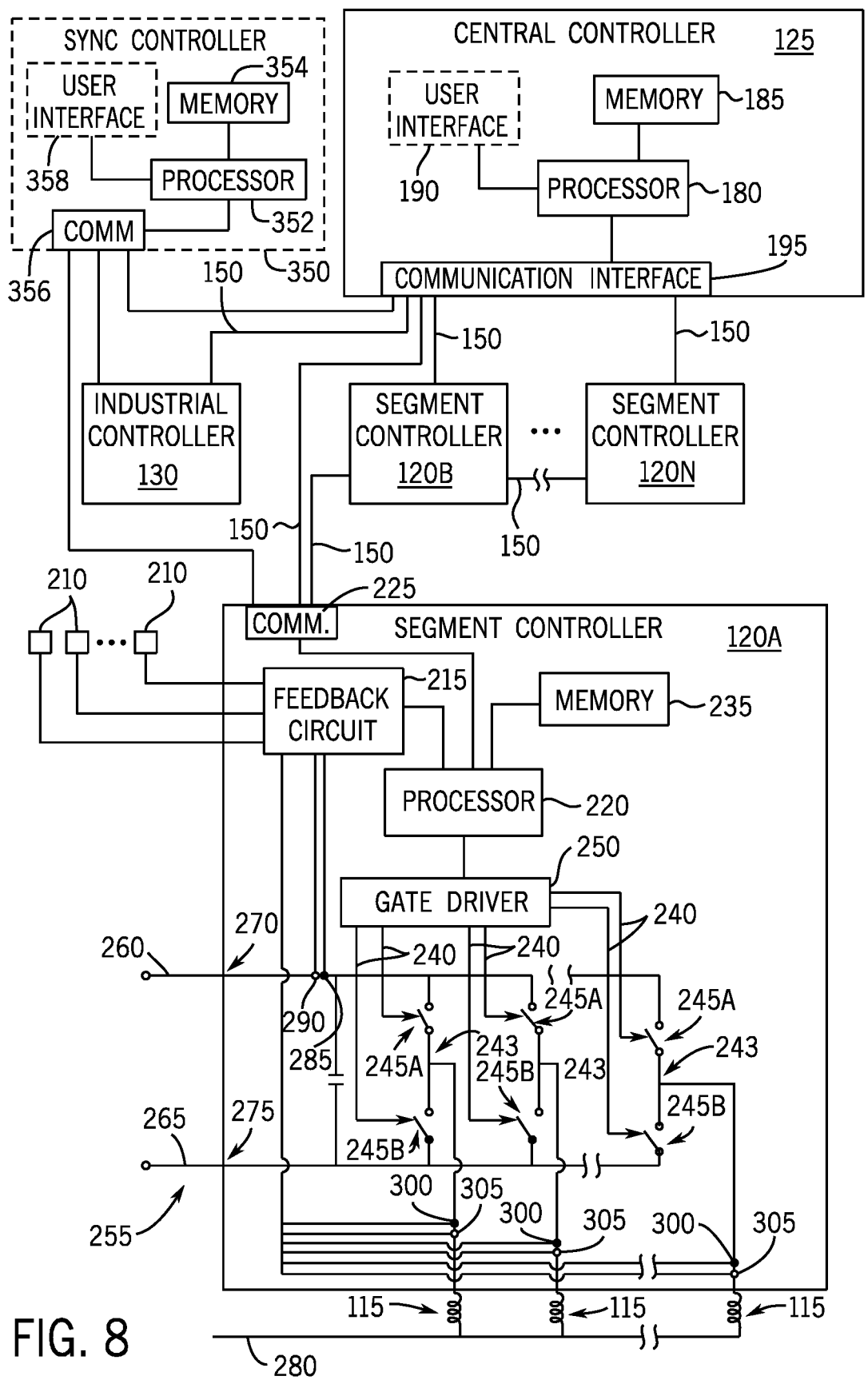
FIG. 8 is a block diagram representation of the one embodiment of the exemplary control system of FIG. 1.

With reference also to FIG. 8, the central controller 125 includes a processor 180 and a memory 185. It is contemplated that the processor 180 and memory 185 may each be a single electronic device or formed from multiple devices. The processor 180 may be a microprocessor. Optionally, the processor 180 and/or the memory 185 may be integrated on a field programmable gate array (FPGA) or an application specific integrated circuit (ASIC). The memory 185 may include volatile memory, non-volatile memory, or a combination thereof. An optional user interface 190 may be provided for an operator to configure the central controller 125 and to load or configure desired motion profiles for the movers 20 on the central controller 125. Optionally, the configuration may be performed via a remote device connected via a network and a communication interface 195 to the central controller 125. It is contemplated that the central controller 125 and user interface 190 may be a single device, such as a laptop, notebook, tablet or other mobile computing device. Optionally, the user interface 190 may include one or more separate devices such as a keyboard, mouse, display, touchscreen, interface port, removable storage medium or medium reader and the like for receiving information from and displaying information to a user. Optionally, the central controller 125 and user interface may be an industrial computer mounted within a control cabinet and configured to withstand harsh operating environments. It is contemplated that still other combinations of computing devices and peripherals as would be understood in the art may be utilized or incorporated into the central controller 125 and user interface 190 without deviating from the scope of the invention.

In one aspect of the invention, the central controller 125 may be configured to operate in a configuration referred to as "centralized control". The central controller 125 includes one or more programs stored in the memory 185 for execution by the processor 180. The central controller 125 receives a desired position from the industrial controller 130 and determines one or more motion profiles for each of the movers 20 to follow along the track 10. A program executing on the processor 180 is in communication with each segment controller 120 on each track segment via the network medium 150. The central controller 125 may transfer a desired motion profile to each segment controller 120.

In another aspect of the invention, the central controller 125 may be configured to operate in a configuration referred to as "distributed control". The central controller 125 may be configured to transfer the information from the industrial controller 130 identifying one or more desired movers 20 to be positioned at or moved along the track segment 15, and each segment controller 120 may determine the appropriate motion profile for a mover 20 present on the corresponding segment controller. It is contemplated that a separate central controller 125 may not be required in distributed control and, rather, the functions otherwise performed by the central controller 125 for communication between the industrial controller 130 and each segment controller 120 may be incorporated into the industrial controller 130.

A position feedback system provides knowledge of the location of each mover 20 along the length of the track segment 15 to the segment controller 120. According to the system 5 illustrated in FIGS. 2 and 4, the position feedback system includes one or more position magnets 205 mounted to the mover 20 and an array of sensors 210 spaced along the side wall 40 of the track segment 15. The sensors 210 are positioned such that each of the position magnets 205 is proximate to the sensor as the mover 20 passes each sensor 210. The sensors 210 are a suitable magnetic field detector including, for example, a Hall-Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 210 outputs a feedback signal provided to the segment controller 120 for the corresponding track segment 15 on which the sensor 210 is mounted. The feedback signal may be an analog signal provided to a feedback circuit 215 which, in turn, provides a signal to the processor 220 corresponding to the magnet 205 passing the sensor 210.

Figure 6:
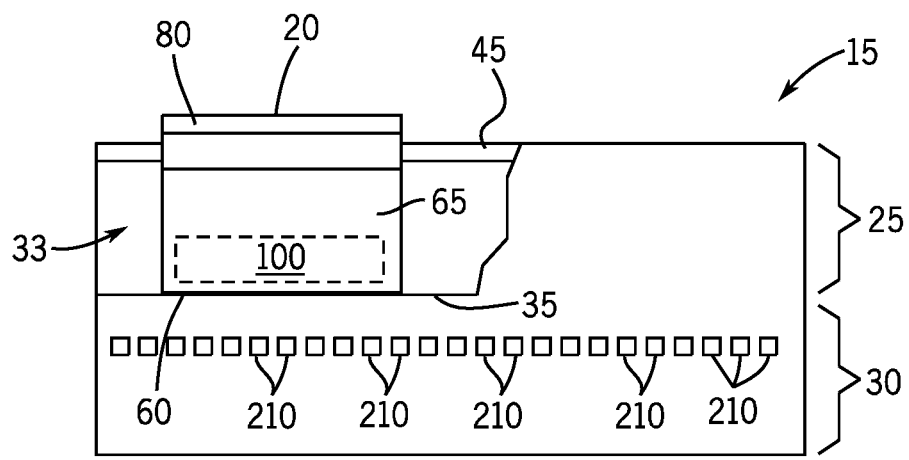
FIG. 6 is a partial side cutaway view of the mover and track segment of FIG. 5.

According to another arrangement, illustrated in FIGS. 5 and 6, the position feedback system utilizes the drive magnets 100 as position magnets. Position sensors 210 are positioned along the track segment 15 at a location suitable to detect the magnetic field generated by the drive magnets 118. According to the illustrated embodiment, the position sensors 210 are located below the coils 115. Optionally, the position sensors 210 may be interspersed with the coils 115 and located, for example, in the center of a coil or between adjacent coils. According to still another embodiment, the position sensors 210 may be positioned within the upper portion 25 of the track segment 15 and near the bottom surface 35 of the channel 33 to be aligned with the drive magnets 118 as each mover 20 travels along the tracks segment 15.

Referring again to FIG. 8, the segment controller 120 also includes a communication interface 225 that receives communications from the central controller 125 and/or from adjacent segment controllers 120. The communication interface 225 extracts data from the message packets on the industrial network and passes the data to a processor 230 executing in the segment controller 120. The processor may be a microprocessor. Optionally, the processor 230 and/or a memory 235 within the segment controller 120 may be integrated on a field programmable gate array (FPGA) or an application specific integrated circuit (ASIC). It is contemplated that the processor 230 and memory 235 may each be a single electronic device or formed from multiple devices. The memory 235 may include volatile memory, non-volatile memory, or a combination thereof. The segment controller 120 receives the motion profile or desired motion of the movers and utilizes the motion commands to control movers 20 along the track segment 15 controlled by that segment controller 120.

Each segment controller 120 generates switching signals to generate a desired current and/or voltage at each coil 115 in the track segment 15 to achieve the desired motion of the movers 20. The switching signals 240 control operation of switching devices 245 for the segment controller 120. According to the illustrated system 5, the segment controller 120 includes a dedicated gate driver module 250 which receives command signals from the processor 220, such as a desired voltage and/or current to be generated in each coil 115, and generates the switching signals 240. Optionally, the processor 220 may incorporate the functions of the gate driver module 250 and directly generate the switching signals 240. The switching devices 245 may be a solid-state device that is activated by the switching signal, including, but not limited to, transistors, thyristors, or silicon-controlled rectifiers.

According to the illustrated system 5, the track 10 receives power from a distributed DC voltage. A DC bus 255 receives a DC voltage, VDC, from a DC supply and conducts the DC voltage to each track segment 15. The illustrated DC bus 255 includes two voltage rails 260, 265 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 15, it is contemplated that the DC bus 255 would extend within the lower portion 30 of the track segment. Each track segment 15 includes connectors to which either the DC supply or another track segment may be connected such that the DC bus 255 may extend for the length of the track 10. Optionally, each track segment 15 may be configured to include a rectifier section (not shown) and receive an AC voltage input. The rectifier section in each track segment 15 may convert the AC voltage to a DC voltage utilized by the corresponding track segment.

The DC voltage from the DC bus 255 is provided at the input terminals 270, 275 to a power section for the segment controller. A first voltage potential is present at the first input terminal 270 and a second voltage potential is present at the second input terminal 275. The DC bus 255 extends into the power section defining a positive rail 260 and a negative rail 265 within the segment controller 120. The terms positive and negative are used for reference herein and are not meant to be limiting. It is contemplated that the polarity of the DC voltage present between the input terminals 270, 275 may be negative, such that the potential on the negative rail 265 is greater than the potential on the positive rail 260. Each of the voltage rails 260, 265 are configured to conduct a DC voltage having a desired potential, according to application requirements. According to one arrangement, the positive rail 260 may have a DC voltage at a positive potential and the negative rail 265 may have a DC voltage at ground potential. Optionally, the positive rail 260 may have a DC voltage at ground potential and the negative rail 265 may have a DC voltage at a negative potential. According to still another arrangement, the positive rail 260 may have a first DC voltage at a positive potential with respect to the ground potential and the negative rail 265 may have a second DC voltage at a negative potential with respect to the ground potential. The resulting DC voltage potential between the two rails 260, 265 is the difference between the potential present on the positive rail 260 and the negative rail 265.

It is further contemplated that the DC supply may include a third voltage rail having a third voltage potential. According to one implementation, the positive rail 260 has a positive voltage potential with respect to ground, the negative rail 265 has a negative voltage potential with respect to ground, and the third voltage rail is maintained at a ground potential. Optionally, the negative voltage rail 265 may be at a ground potential, the positive voltage rail 260 may be at a first positive voltage potential with respect to ground, and the third voltage rail may be at a second positive voltage potential with respect to ground, where the second positive voltage potential is approximately one half the magnitude of the first positive voltage potential. With such a split voltage DC bus, two of the switching devices 245 may be used in pairs to control operation of one coil 115 by alternately provide positive or negative voltages to one the coils 115.

The power section in each segment controller 120 may include multiple legs, where each leg is connected in parallel between the positive rail 260 and the negative rail 265. According to the system illustrated in FIG. 8, three legs are shown arranged in a half-bridge configuration. However, the number of legs may vary and will correspond to the number of coils 115 extending along the track segment 15. Each leg includes a first switching device 245a and a second switching device 245b connected in series between the positive rail 260 and the negative rail 265 with a common connection 243 between the first and second switching devices 245a, 245b. The first switching device 245a in each leg 221 may also be referred to herein as an upper switch, and the second switching device 245b in each leg 221 may also be referred to herein as a lower switch. The terms upper and lower are relational only with respect to the schematic representation and are not intended to denote any particular physical relationship between the first and second switching devices 245a, 245b. The switching devices 245 include, for example, power semiconductor devices such as transistors, thyristors, and silicon-controlled rectifiers, which receive the switching signals 240 to turn on and/or off. Each of switching devices may further include a diode connected in a reverse parallel manner between the common connection 243 and either the positive or negative rail 260, 265.

Figure 9:
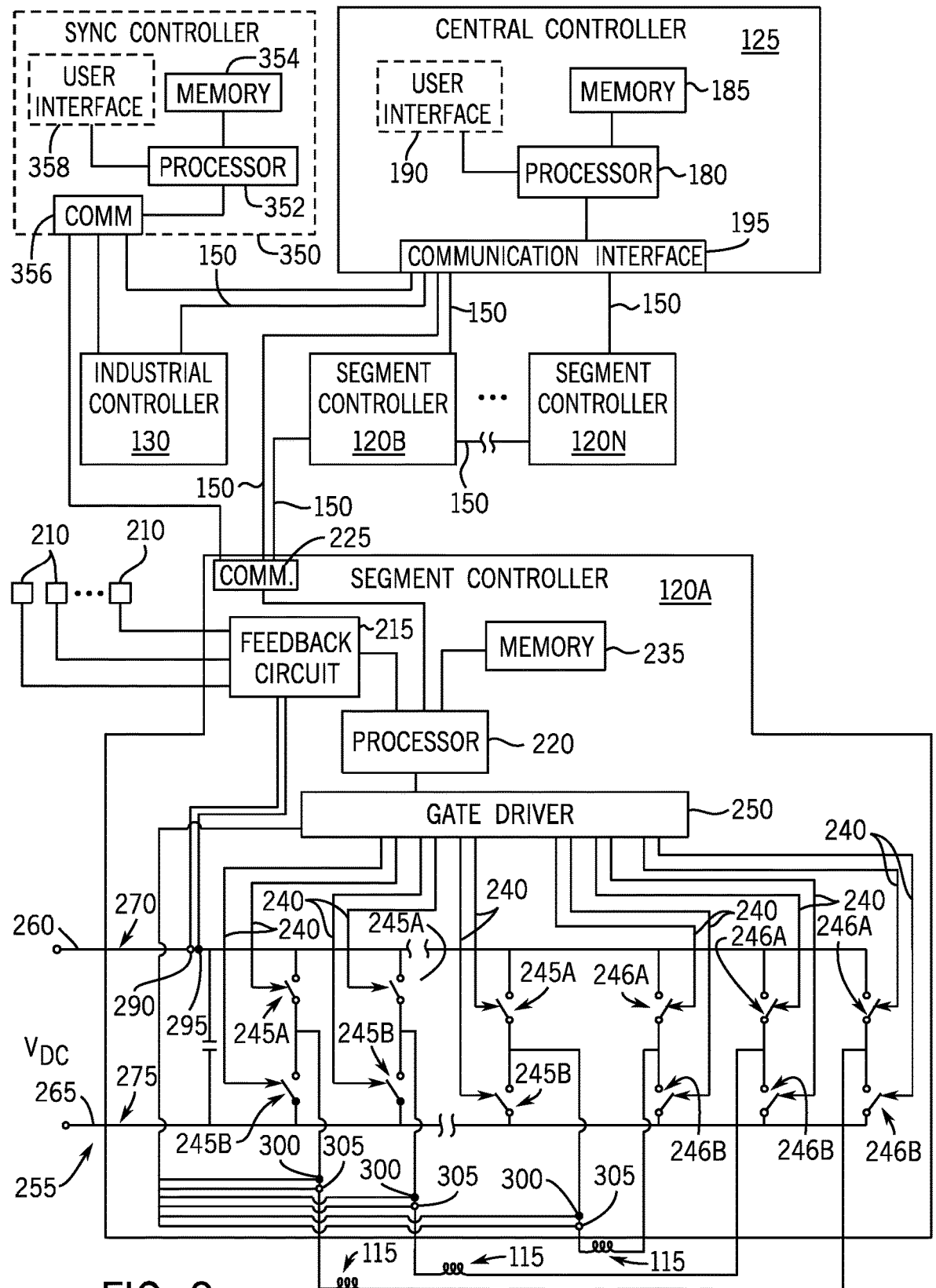
FIG. 9 is a block diagram representation of another embodiment of the exemplary control system of FIG. 1.

According to the embodiment illustrated in FIG. 9, three legs are shown arranged in a full-bridge configuration. Again, the number of legs may vary and will correspond to the number of coils 115 extending along the track segment 15. Each leg includes a first switching device 245a and a second switching device 245b connected in series on one side of the coil 115. The first and second switching devices 245a, 245b are connected between the positive rail 260 and the negative rail 265 with a first common connection between the first and second switching devices 245a, 245b. The first common connection is connected to the first side of the coil 115. Each leg further includes a third switching device 246a and a fourth switching device 246b connected in series on the other side of the coil 115. The third and fourth switching devices 246a, 246b are connected between the positive rail 260 and the negative rail 265 with a second common connection between the third and fourth switching devices 246a, 246b. The second common connection is connected to the second side of the coil 115. The first and third switching devices 245a, 246a in each leg may also be referred to herein as upper switches, and the second and fourth switching devices 245b, 246b in each leg may also be referred to herein as lower switches. The terms upper and lower are relational only with respect to the schematic representation and are not intended to denote any particular physical relationship between the switching devices. The switching devices 245, 246 include, for example, power semiconductor devices such as transistors, thyristors, and silicon-controlled rectifiers, which receive the switching signals 240 to turn on and/or off. Each of switching devices 245, 246 may further include a diode connected in a reverse parallel manner between the first or second common connection and either the positive or negative rail 260, 265.

With reference again to FIG. 8, the processor 220 also receives feedback signals from sensors providing an indication of the operating conditions within the power segment or of the operating conditions of a coil 115 connected to the power segment. According to the illustrated system 5, the power segment includes a voltage sensor 285 and a current sensor 290 at the input of the power segment. The voltage sensor 285 generates a voltage feedback signal and the current sensor 290 generates a current feedback signal, where each feedback signal corresponds to the operating conditions on the positive rail 260. The segment controller 120 also receives feedback signals corresponding to the operation of coils 115 connected to the power segment. A voltage sensor 300 and a current sensor 305 are connected in series with the coils 115 at each output of the power section. The voltage sensor 300 generates a voltage feedback signal and the current sensor 305 generates a current feedback signal, where each feedback signal corresponds to the operating condition of the corresponding coil 115. The processor 230 executes a program stored on the memory device 235 to regulate the current and/or voltage supplied to each coil and the processor 230 and/or gate driver module 250 generates switching signals 240 which selectively enable/disable each of the switching devices 245 to achieve the desired current and/or voltage in each coil 115. With reference also to FIG. 9, it is contemplated that the feedback signals from the current sensor 305 and/or the voltage sensor 300 corresponding to the operation of the coils 115 may be provided to a dedicated current regulator device. As shown in FIG. 9, the feedback signals are provided directly to the gate driver 250 which would, in turn, regulate the current output to each coil and generate the switching signals 240 accordingly. The energized coils 115 create an electromagnetic field that interacts with the drive magnets 118 on each mover 20 to control motion of the movers 20 along the track segment 15.

As further illustrated in FIGS. 8 and 9, the control system may also include a synchronization controller 350. The synchronization controller 350 includes a processor 352 in communication with a memory device 354. The memory device 354 is configured to store instructions for execution by the processor. It is contemplated that the processor 352 and memory 354 may each be a single electronic device or formed from multiple devices. The processor 352 may be a microprocessor. Optionally, the processor 352 and/or the memory 354 may be integrated on a field programmable gate array (FPGA) or an application specific integrated circuit (ASIC). The processor 352 may include a single core or multiple cores. The memory 354 may include volatile memory, non-volatile memory, or a combination thereof. An optional user interface 358 may be provided for an operator to configure the synchronization controller 350 and to load or configure desired motion profiles for the movers 20 operating in tandem as a platoon, or chain, of movers. Alternately, the configuration may be performed via a remote device connected via a network and a communication interface 356 on the synchronization controller 350. The communication interface 356 is also configured to connect with the network medium 150 for communication with the central controller 125, industrial controller 130, and/or segment controllers 120. In certain applications, it is contemplated that the functions of the synchronization controller 350 may be performed either in whole, or in part, in the central controller 125, the industrial controller 130, the segment controllers 120, or a combination thereof.

Figure 10:
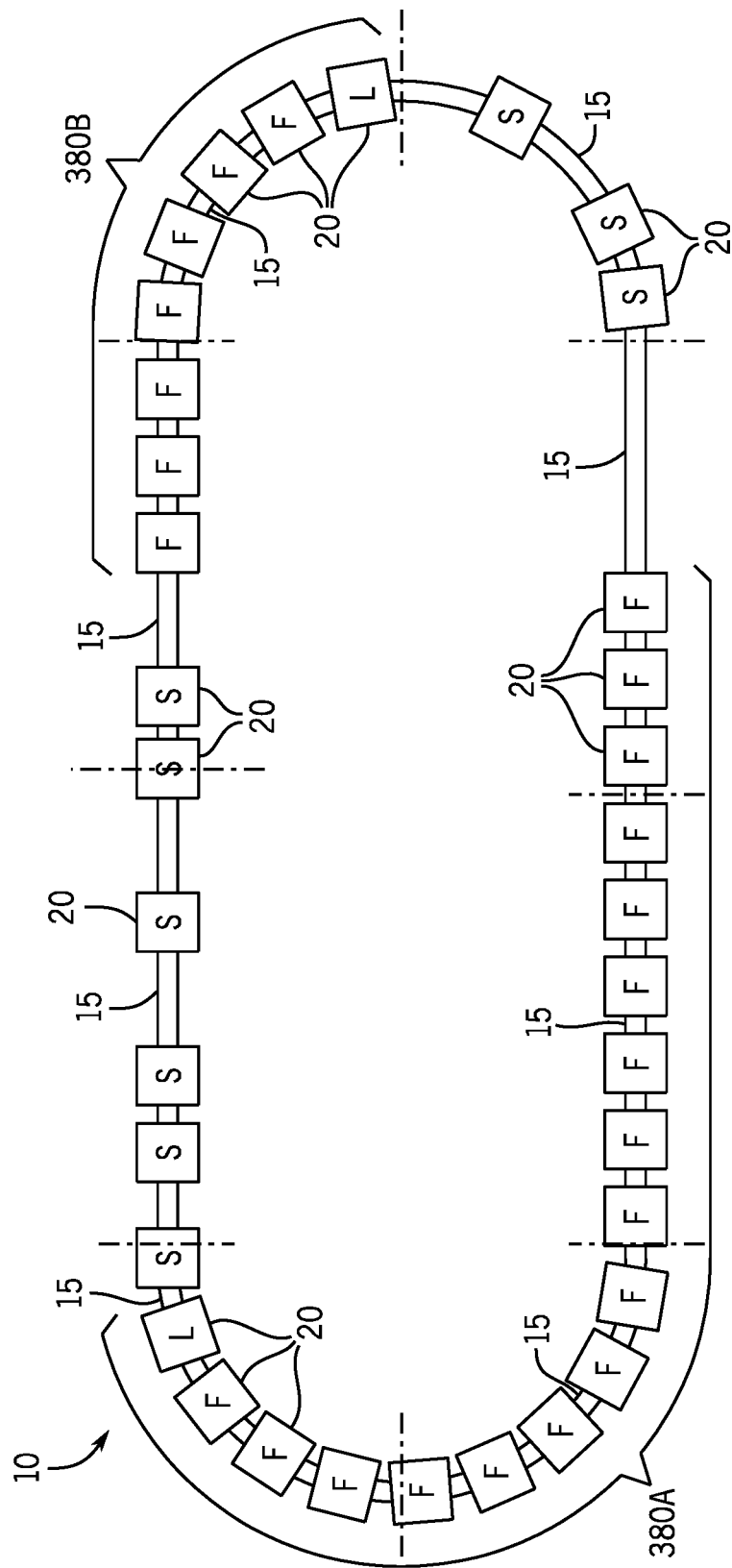
FIG. 10 is a block diagram representation of an independent cart system with a single track and multiple movers.

In operation, it is contemplated that the independent cart system 5 is operating under distributed control and that each segment controller 120 is responsible for controlling operation of a mover 20 present on the corresponding track segment 15. With reference next to FIG. 10, each mover 20 is configured to operate either independently of the other movers 20 or in a chain of movers 380. According to the illustrated embodiment, each mover 20 configured to operate independently of the other movers 20 is labelled with an "S". Each mover 20 configured to operate in a chain of movers 380 is labelled with either an "L" or an "F", where the mover 20 labelled with an "L" is a leader in the chain 380 and the mover 20 labelled with an "F" is a follower in the chain. A chain of movers 380 includes a single leader, L, and one or more followers, F. As shown in FIG. 10, a first chain of movers 380A includes seventeen (17) followers and a second chain of movers 380B includes seven (7) followers.

According to one embodiment of the invention, the chains 380 are defined by the synchronization controller 350. It is contemplated that the chains may be statically or dynamically defined during operation of the independent cart system. A statically defined chain 380 includes one leader, L, and a defined number of followers, F. The number of followers remains constant and the chain remains the same length as it travels along the track. A statically defined chain may be used, for example, to pair two or three movers 20 together to transport a single object along the length of the track 10. The chain 380 may pass loading and unloading zones where multiple instances of the object are loaded and unloaded, but the chain 380 remains constant as it returns from the unloading zone to the loading zone to receive a new object. Alternately, chains 380 may be dynamically defined. It is contemplated, for example, that a loading zone may receive objects of varying size. A differing number of movers 20 may be required to transport each object. The synchronization controller 350 receives an identifier defining the next object in the queue and defines a chain 380 of movers having sufficient length to transport the object. Multiple movers 20 may be waiting in a queuing zone and the synchronization controller 350 defines the next mover 20 available in the queue as a leader, L, and an appropriate number of movers 20 as followers, F, such that the chain 380 may transport the object. The chain 380 travels from the queue to a loading station to receive the object. Between the loading and unloading zone, the movers 20 travel in the chain 380. Once the object is unloaded, the synchronization controller 350 defines each mover 20 as an independent mover and the movers 20 travel back to the queue as separate movers for a subsequent assignment. According to another application, it is contemplated that movers 20 may travel in a chain along a certain segment of track and as independent movers 20 along the rest of the track. For instance, it may be desirable to have movers 20 travel in a chain 380 while external actuators interact with the movers 20 or with a load on the mover 20. Throughout the work zone, movers 20 travel in a chain 380. Outside of the work zone, the movers 20 travel independently from the end of the work zone back to the start of the work zone. The synchronization controller 350 continually redefines the chain 380 with a new leader as each mover 20 presently designated as a leader leaves the work zone and further adds additional movers 20 to the end of the chain as followers as each mover 20 enters the work zone.

Figure 11:
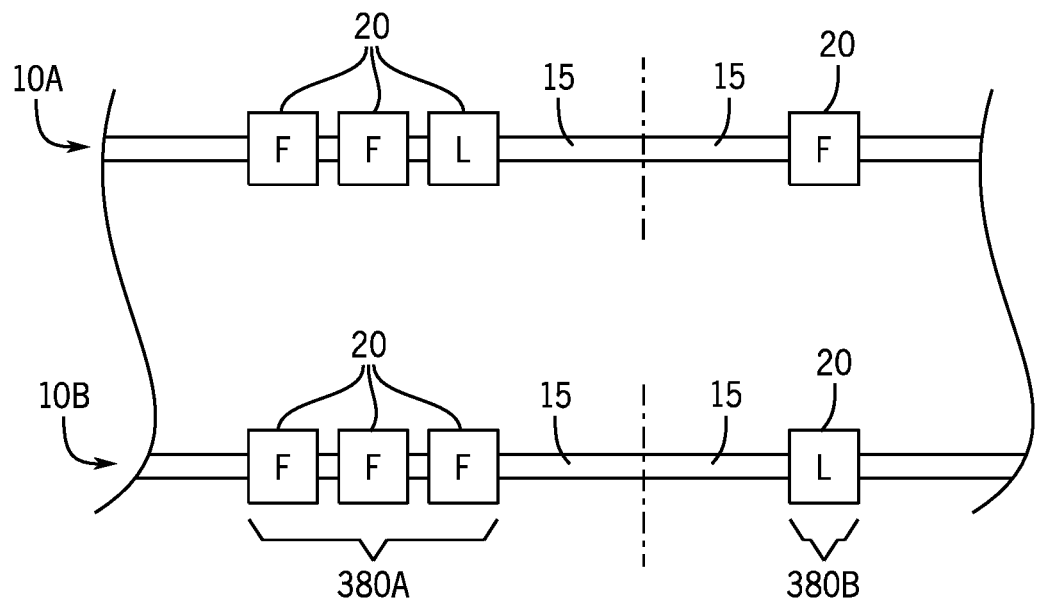
FIG. 11 is a block diagram representation of an independent cart system with multiple tracks and multiple movers.
Figure 12:
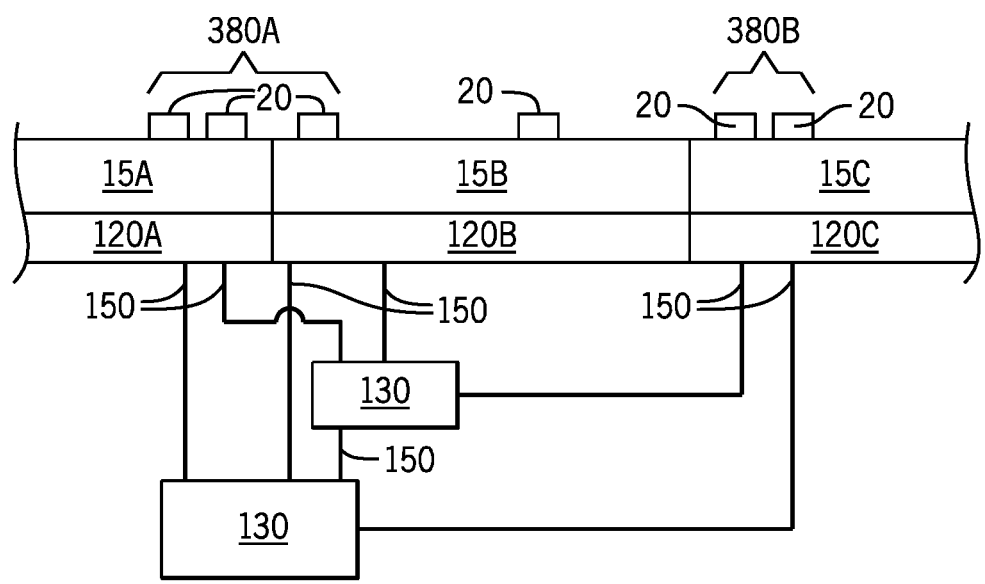
FIG. 12 is a schematic representation of an exemplary control system for a linear drive system according to another embodiment of the invention.

With reference also to FIG. 11, it is contemplated that a chain 380 may be include followers configured in formations other than sequential order. According to the illustrated embodiment, an application includes two tracks. A portion of a first track 10A and a portion of a second track 10B are illustrated. A first chain 380A is shown with a leader, L, assigned on the first track 10A. The first chain 380A includes two followers, F, on the first track 10A and three followers on the second track 10B. A second chain 380B is shown with a leader, L, assigned on the second track 10B and a single follower, F, present on the first track 10A. For each chain, the movers 20 on each track 10A, 10B operate in tandem with a controller for the leader, L, receiving a desired motion profile. The controller for the leader transmits the motion profile to a controller for each follower and the movers 20 operate in tandem to follow the desired motion profile.

A motion command is generated for each mover 20 in the system 5 to define desired operation of the mover. According to one aspect of the invention, the industrial controller 130 is configured to execute a control program to achieve desired operation of the system. The control program receives input signals 165 corresponding to the current status of devices in the system and generates output signals 175 to control actuators or other devices in the system according to the present status of the devices in the system. The control program may include a motion command for one or more of the movers 20, where the motion command may be, for example, a command to move to desired position along the track, utilizing track coordinated, or to move to a desired location, utilizing a station number, or other such identifier defining a location along the track.

The motion command is converted from a desired position or location along the track to a desired motion profile for the mover 20. The desired motion profile may include a series of positions at which the mover 20 is to be located and further include, for example, acceleration or deceleration rates and velocity of the mover at each location. Optionally, the motion profile may be a series of positions in time which are generated as a function of desired acceleration or deceleration rates and velocity at which the mover is to travel. The acceleration or deceleration rates and velocity may be configured for each mover 20 and may vary as a function of a load present on the mover 20, a location of the mover, on an interaction occurring with an actuator located externa to the mover, or the like. The motion command may be generated by the processor module 155 or by a dedicated motion control module located in the industrial controller 130. Optionally, the industrial controller 130 may communicate the motion command to the central controller 125 or to a segment controller 120 on which the mover 20 is located, and the central controller 125 or corresponding segment controller 120 may be configured to generate the desired motion profile for each mover. Each segment controller 120 uses the motion profile for a mover 20 located on the corresponding track segment 15 to regulate current to the coils 115 and obtain desired motion of the mover 20 in response to the motion profile.

When multiple movers 20 are grouped together to travel in a chain 380, a single motion profile is generated for the chain. The motion profile is provided to the segment controller 120 on which the mover 20 which will be the leader, L, for the chain is located. As previously indicated, a chain 380 may be static or dynamic in the number of movers 20 and may have a leader, L, dynamically assigned as the chain 380 moves along the track. In some applications, it is advantageous to use a synchronization controller 350 to maintain organization of the chains 380. The synchronization controller 350 may identify each mover 20 that is to be included in a static chain 380. Similarly, the synchronization controller 350 may maintain a record of and coordinate dynamic allocation of movers 20 in a dynamic chain.

In addition to maintaining records of which movers 20 are included in each chain 380, the synchronization controller 350 may manage generation of and/or transmission of motion profiles to segment controllers 120. The synchronization controller 350 receives motion commands from the industrial controller 130 and generates the motion profiles for the chain 380. The synchronization controller transmits the motion profile to the segment controller 120 for the mover 20 identified as the leader. This motion profile for the mover 20 identified as the leader of the chain is a reference profile for the chain. The synchronization controller 350 may further be configured to transmit the reference profile to each segment controller 120 controlling one of the movers 20 in the chain 380. Optionally, the synchronization controller 350 transmits the reference profile only to the segment controller 120 corresponding to the leader and also transmits a length of the chain, or the number of followers, F, to be included in the chain 380. The synchronization controller 350 may be configured to receive feedback from the segment controller 120 corresponding to a position of the leader. The synchronization controller 350 may transmit the motion profile to successive segment controllers 120 as the leader, L, travels along the track. Alternately, and in a fully distributed system, the synchronization controller 350 transmits a motion command, desired position, or motion profile to the segment controller 120 on which the leader, L, is located at the beginning of a commanded mover, and the segment controller 120 communicates with adjacent segment controllers to pass the motion command, desired position, or motion profile to the adjacent segment controller as a mover 20 transitions between track segments 15.

It is contemplated that the chains 380 of movers may be configured to follow the reference motion profile according to two different options. In a first aspect of the invention, the segment controller 120 on which the leader, L, is located obtains a motion profile for the chain 380. The chain 380 is configured to operate as a single group of movers 20, and the segment controller 120 transmits the motion profile to each of the additional segment controllers 120 on which a mover 20 in the chain 380 is located. The additional segment controller determines a motion profile for the mover 20 in the chain 380 that is present on the corresponding track segment 15. Each mover 20 has a desired following distance from the leader, L, and the new motion profile corresponds to the reference profile minus the following distance. If, for example, each mover 20 in a chain is to be spaced apart by ten millimeters, the first follower has a following distance of ten millimeters, the second follower has a following distance of twenty millimeters plus the width of the first follower, and so on. Each segment controller then generates the switching signals 240 to regulate current through the coils 115 on the corresponding track segment 15 to achieve desired operation of the mover 20 in the chain according to its respective motion profile.

In a second aspect of the invention, the segment controller 120 on which the leader, L, is located obtains a motion profile for the chain 380. The chain 380 is configured to operate as a series of linked movers 20, and the segment controller 120 transmits the motion profile one hop to an adjacent segment controller 120 on which the next mover 20 in the chain 380 is located. The adjacent segment controller determines a motion profile for the mover 20 in the chain 380 that is present on the corresponding track segment 15. Each mover 20 has a desired following distance from the mover one hop in front of it in the chain 380. The new motion profile corresponds to the motion profile received from the adjacent segment controller 120 minus the following distance. After determining a new motion profile for the mover 20 on the second track segment, the segment controller 120 for the second track segment passes the new motion profile one hop on to the next adjacent segment controller 120. The next adjacent segment controller determines another new motion profile for the next mover 20 in the chain. The process repeats until all movers 20 in the chain 380 have a motion profile that has been determined as a function of the original, reference motion profile for the chain. Each segment controller then generates the switching signals 240 to regulate current through the coils 115 on the corresponding track segment 15 to achieve desired operation of the mover 20 in the chain according to its respective motion profile.

It is also contemplated that each segment controller 120 maintains a motion profile for each mover located on the segment controller. If, for example, the segment controller 120 has two movers 20 present on the track segment 15 operated by the segment controller 120, the segment controller 120 will maintain two separate motion profiles. Similarly, if the segment controller 120 has three movers 20 present on the track segment 15 operated by the segment controller 120, the segment controller 120 will maintain three separate motion profiles, and so on for any number of movers present on a track segment. For ease of description, operation of the chain 380 will be discussed as if one mover 20 is present on each track segment 15 and each mover 20 is being controlled by a separate segment controller 120. However, similar operation would occur when a chain 380 includes multiple followers, F, on a single track segment 15. A segment controller 120 maintains separate motion profiles for each mover 20 and rather than transmitting data between adjacent segment controllers 120, a segment controller passes information internally on the segment controller between motion profiles for each mover on the segment.

After having determined a motion profile for each mover 20 in the chain 380, each segment controller 120 attempts to maintain the desired profile for each mover present on the corresponding track segment 15. As previously discussed, many factors impact the ability of a mover 20 to maintain the desired motion profile. Variations in manufacture, whether on a straight or curved track segment, and wear on the mover or track segments impact performance. One segment controller 120 for a follower, F, mover may not be able to maintain the desired motion profile for the leader, L, within a chain 380. Each segment controller 120 monitors the performance of each mover 20 it is controlling to determine whether the mover 20 is able to follow the desired motion profile.

When a mover 20 begins to deviate from the desired motion profile, the segment controller 120 controlling the mover 20 determines a hold back for the respective mover. A hold back is some value that may be used to make the desired motion profile less aggressive and, therefore, easier for a mover 20 to follow. A hold back may be, for example, a desired reduction in velocity, rate of acceleration, or a position value. The hold back may be determined as a function of the motion profile and of the application requirements. According to one aspect of the invention, the hold back may be a position value, corresponding to an amount of tracking error observed by the segment controller 120. Tracking error is a difference between a desired location of the mover 20, as defined in the motion profile for the mover, and an actual location of the mover, as observed via the position sensors 210 spaced along each track segment 15. If a segment controller 120 is unable to maintain the desired motion profile, the tracking error will increase. Although a small amount of tracking error is acceptable, if the value of the tracking error exceeds a predefined amount, the segment controller 120 sets the hold back value equal to the tracking error. In other applications, a segment controller 120 may predictively determine a hold back value. The segment controller 120 may maintain a record of past performance of a mover 20 and limit performance of a commanded motion profile based on the past performance. According to still other options, the segment controller 120 may compare a motion profile to limits established for zones of operation along the track. A first portion of the chain 380 may be present in one zone of operation, and a second portion of the chain 380 may be present in a second zone of operation. The motion profile for the leader, L, may be set according to the first zone, but movers 20 within the second zone of operation may have restrictions imposed as a function of being located in the second zone. The segment controller 120 may determine appropriate hold back values in advance of controlling the mover 20 based either on past performance or on location of the mover 20 to minimize tracking error from occurring.

After determining a hold back value, a segment controller 120 transmits the hold back value to the segment controller 120 responsible for controlling the leader, L. When the chain 380 is configured to operate as a single group of movers 20 and the segment controller 120 transmits the motion profile to each of the additional segment controllers 120 on which a mover 20 in the chain 380 is located, each of the additional segment controllers is configured to transmit the hold back value to the segment controller 120 responsible for controlling the leader, L. The segment controller 120 responsible for controlling the leader, L, is then aware of any performance limitations experienced by each mover 20 in the chain 380. The segment controller for the leader modifies the motion profile according to the hold back value requiring the greatest hold back such that each mover 20 in the chain 380 will be able to follow the motion profile. The segment controller 120 for the leader then transmits the modified motion profile to each of the additional segment controllers 120. The additional segment controllers 120 again determines a motion profile for the mover located on the corresponding track segment by subtracting the desired following distance from the modified motion profile for the leader as previously discussed. The segment controllers 120 for the leader and for each follower now follow the modified motion profile which every mover 20 in the chain 380 should be able to track.

When the chain 380 is configured to operate as a series of linked movers 20 and the segment controller 120 transmits the motion profile to an adjacent segment controller 120 on which the next mover 20 in the chain 380 is located, each additional segment controller 120 transmits the hold back value to the adjacent segment controller form which it originally received the motion profile. As the hold back value is transmitted along the series of linked controllers, the controllers may be configured to compare a hold back value, if any, which it has determined to a hold back value, if any, it has received from an adjacent segment controller. The segment controllers 120 may then transmit the greater of the two hold back values on to the next adjacent controller. As a result, the greatest hold back value from each segment controller 120 in the chain 380 reaches the segment controller for the leader. Alternately, each segment controller may create a data packet containing a hold back value determined for a mover corresponding to that controller as well as any hold back values received from an adjacent controller. As the hold back values are transmitted to adjacent controllers, each segment controller with a hold back value may add its own hold back value to the data packet.

The segment controller 120 for the leader then receives all of the hold back values and is aware of any performance limitations experienced by each mover 20 in the chain 380. According to either option, the segment controller for the leader modifies the motion profile according to the hold back value requiring the greatest hold back such that each mover 20 in the chain 380 will be able to follow the motion profile. The modified motion profile is transmitted back along the linked segment controllers in the manner previously discussed, and each additional segment controllers 120 again determines a motion profile for the mover located on the corresponding track segment by subtracting the desired following distance from the motion profile received from the adjacent segment controller. The segment controllers 120 for the leader and for each follower now follow the modified motion profile which every mover 20 in the chain 380 should be able to track. The process of determining hold back values and modifying the motion profile is repeated as the chain 380 travels along the track such that any mover 20 being unable to maintain the desired motion profile at any point during the move causes the corresponding segment controller 120 responsible for controlling operation of the mover to modify the motion profile such that the mover 20 is able to follow the motion profile.

In addition to reducing the aggressiveness of a motion profile, it is contemplated that the communication between segment controllers 120 may be utilized to resume following the original commanded motion profile. After determining a hold back value and transmitting the hold back value to the segment controller 120 for the leader, L, in a chain 380, each segment controller 120 continues to monitor performance of the mover(s) 20 for which it is responsible. If a mover 20 had previously experience tracking error but is now following the modified motion profile, there is no hold back value being transmitted to the segment controller 120 responsible for controlling the leader in the chain 380. The segment controller 120 responsible for controlling the leader may resume following the original motion profile is it no longer receives a hold back value. According to one aspect of the invention, the segment controller 120 may immediately resume the original motion profile. If any mover 20 in the chain 380 is still unable to follow the original motion profile, a new hold back value will be determined and transmitted back to the segment controller for the leader. According to another aspect of the invention, the segment controller 120 for the leader, L, may be configured to incrementally return to the original motion profile. At each increment, the segment controller 120 for the leader, L, may allow the chain 380 to travel for a short duration at the incrementally more aggressive motion profile and monitor hold back values from each additional segment controller 120. If each mover 20 is able to follow the incrementally more aggressive motion profile, the segment controller 120 for the leader, L, continues to incrementally return to the original motion profile until either the original motion profile is obtained or one of the additional segment controllers indicate that the mover 20 for which it is responsible can no longer track the motion profile and a new hold back value is transmitted to the segment controller 120 for the leader, L. In this manner, the segment controllers 120 may temporarily modify a motion profile if a mover 20 is unable to follow the motion profile at a certain location and then return to the original motion profile when each mover 20 is again able to follow the original motion profile.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A system for synchronizing motion of multiple movers in an independent cart system, the independent cart system including a track and a plurality of movers configured to travel along the track, wherein the track includes a plurality of track segments, the system comprising:
   a first mover for leading a chain of movers, wherein the first mover is selected from the plurality of movers in the independent cart system;
   at least one additional mover, wherein:
      the at least one additional mover is selected from the plurality of movers in the independent cart system, and
      the first mover and each of the at least one additional movers are included within the chain of movers;
   a first segment controller, wherein the first segment controller is located in a first track segment, selected from the plurality of track segments, and the first segment controller is configured to control operation of the first mover while the first mover is present on the first track segment; and
   at least one additional segment controller, wherein the at least one additional segment controller is located in an additional track segment, selected from the plurality of track segments, and the at least one additional segment controller is configured to control operation of the at least one additional mover while the at least one additional mover is present on the additional track segment, wherein:
   the first segment controller is configured to obtain a desired motion profile for the first mover,
   the first segment controller is configured to transmit the desired motion profile to the at least one additional segment controller,
   the at least one additional segment controller is configured to detect that the at least one additional mover is unable to follow the desired motion profile,
   the at least one additional segment controller is configured to determine a desired hold back for the at least one additional mover, wherein the hold back is a value to modify the desired motion profile to a modified motion profile such that the at least one additional mover is able to follow the modified motion profile,
   the at least one additional segment controller is configured to transmit the desired hold back to the first segment controller, and
   the first segment controller is configured to modify the desired motion profile for the first mover to the modified motion profile as a function of the desired hold back received from the at least one additional segment controller.

2. The system of claim 1 wherein:
the at least one additional mover includes a plurality of additional movers,
the at least one additional segment controller includes a plurality of additional segment controllers,
the first segment controller is configured to transmit the desired motion profile to each of the plurality of additional segment controllers,
each of the plurality of additional segment controllers is configured to transmit the desired hold back determined in the corresponding controller to the first segment controller, and
the first segment controller is configured to modify the desired motion profile as a function of the desired hold back having a largest amplitude.

3. The system of claim 1 wherein:
the at least one additional mover includes a plurality of additional movers,
the at least one additional segment controller includes a plurality of additional segment controllers,
the first segment controller is configured to transmit the desired motion profile to one of the plurality of additional segment controllers located adjacent to the first controller,
the additional segment controller located adjacent to the first segment controller is configured to determine a new desired motion profile as a function of the desired motion profile and of a desired following distance,
the additional segment controller located adjacent to the first segment controller is configured to transmit the new desired motion profile to another additional segment controller located one hop away, and
each of the additional segment controllers are configured to determine another new desired motion profile as a function of the new desired motion profile from the additional segment controller immediately adjacent and of the desired following distance.

4. The system of claim 3 wherein each of the additional segment controllers is further configured to determine a desired hold back as a function of the new desired motion profile for the corresponding additional segment controller and to transmit the desired hold back to the first segment controller via each additional segment controller located between the corresponding additional segment controller and the first segment controller.

5. The system of claim 1 further comprising a synchronization controller configured to determine the first mover and the at least one additional mover to define the chain of movers and to transmit a motion command to the first segment controller for the first mover.

6. The system of claim 5 wherein the first segment controller is configured to obtain the desired motion profile as a function of the motion command.

7. The system of claim 5 wherein the motion command transmitted from the synchronization controller to the first segment controller is the desired motion profile.

8. The system of claim 1 wherein the at least one additional segment controller is further configured to;
determine a following error as a function of a present position and the desired motion profile for the at least one additional mover, and
determine the desired hold back as a function of the following error.

9. The system of claim 1 wherein the first mover and the at least one additional mover are located on one track segment and the first segment controller and the at least one additional segment controller are the same controller.

10. The system of claim 1 wherein:
the independent cart system includes a first track and a second track,
the second track is oriented parallel to the first track,
the first mover and the first segment controller are located on the first track, and
the at least one additional mover and the at least one additional segment controller are located on the second track.

11. A method for synchronizing motion of multiple movers in an independent cart system, the independent cart system including a track and a plurality of movers configured to travel along the track, wherein the track includes a plurality of track segments, the method comprising the steps of:
obtaining a desired motion profile for a first mover with a first segment controller, wherein the first segment controller is located in a first track segment, selected from the plurality of track segments;
transmitting the desired motion profile from the first controller to at least one additional segment controller, wherein:
the at least one additional segment controller is located in an additional track segment, selected from the plurality of track segments,
the at least one additional track segment has at least one additional mover located on the at least one additional track segment, and
the first mover and the at least one additional mover are configured to travel along the track as a chain of movers;
detecting with the at least one additional segment controller that the at least one additional mover is unable to follow the desired motion profile,
determining a desired hold back for the at least one additional mover with the at least one additional segment controller, wherein the hold back is a value to modify the desired motion profile to a modified motion profile such that the at least one additional mover is able to follow the modified motion profile;
transmitting the hold back from the at least one additional segment controller to the first segment controller; and
modifying the desired motion profile in the first segment controller as a function of the desired hold back.

12. The method of claim 11, wherein:
the at least one additional mover includes a plurality of additional movers,
the at least one additional segment controller includes a plurality of additional segment controllers,
the first segment controller is configured to transmit the desired motion profile to each of the plurality of additional segment controllers,
each of the plurality of additional segment controllers is configured to transmit the desired hold back determined in the corresponding controller to the first segment controller, and
the first segment controller is configured to modify the desired motion profile as a function of the desired hold back having a largest amplitude.

13. The method of claim 11 wherein:
the at least one additional mover includes a plurality of additional movers, the at least one additional segment controller includes a plurality of additional segment controllers, the first segment controller is configured to transmit the desired motion profile to one of the plurality of additional segment controllers located adjacent to the first segment controller, the method further comprising the steps of:

determining a new desired motion profile as a function of the desired motion profile and of a desired following distance with the additional segment controller located adjacent to the first segment controller;

transmitting the new desired motion profile from the additional segment controller located adjacent to the first segment controller to another additional segment controller located one hop away; and determining another new desired motion profile with each of the additional segment controllers as a function of the new desired motion profile from the additional segment controller immediately adjacent and of the desired following distance.

14. The method of claim 13 further comprising the steps of:

determining a desired hold back with each of the additional segment controllers as a function of the new desired motion profile for the corresponding additional segment controller; and transmitting the desired hold back from the corresponding additional segment controller to the first segment controller via each additional segment controller located between the corresponding additional segment controller and the first segment controller.

15. The method of claim 11 further comprising the steps of:

defining the chain of movers with a synchronization controller; and transmitting a motion command to the first segment controller from the synchronization controller for the first mover.

16. The method of claim 15 wherein the first segment controller is configured to obtain the desired motion profile as a function of the motion command.

17. The method of claim 15 wherein the motion command transmitted from the synchronization controller to the first segment controller is the desired motion profile.

18. The method of claim 11 further comprising the steps of:

determining a following error with the at least one additional segment controller as a function of a present position and the desired motion profile for the at least one additional mover, and determining the desired hold back as a function of the following error.

19. The method of claim 11 wherein the first mover and the at least one additional mover are located on one track segment and the first segment controller and the at least one additional segment controller are the same controller.

20. The method of claim 11 wherein:

the independent cart system includes a first track and a second track, the second track is oriented parallel to the first track, the first mover and the first segment controller are located on the first track, and the at least one additional mover and the at least one additional segment controller are located on the second track.

* * * * *